US009133727B2

(12) United States Patent
Nolfi et al.

(10) Patent No.: US 9,133,727 B2
(45) Date of Patent: Sep. 15, 2015

(54) SENSOR FOREIGN MATERIAL EXCLUSION DEVICES AND METHODS

(75) Inventors: Thomas Joseph Nolfi, Chardon, OH (US); Mario Michael Nolfi, Willoughby, OH (US)

(73) Assignee: ADVANCED F.M.E. PRODUCTS, Mentor, OH (US)

( * ) Notice: Subject to any disclaimer, the term of this patent is extended or adjusted under 35 U.S.C. 154(b) by 955 days.

(21) Appl. No.: 12/930,555

(22) Filed: Jan. 11, 2011

(65) Prior Publication Data

US 2011/0169630 A1 Jul. 14, 2011

Related U.S. Application Data

(60) Provisional application No. 61/335,933, filed on Jan. 12, 2010.

(51) Int. Cl.
*G01V 3/00* (2006.01)
*F01D 17/02* (2006.01)

(52) U.S. Cl.
CPC .......... *F01D 17/02* (2013.01); *F05D 2260/607* (2013.01)

(58) Field of Classification Search
CPC ...................... G06Q 10/0833; F25D 2331/804
USPC ........ 340/539.13, 539.1, 853.1, 853.3, 856.2, 340/854.5
See application file for complete search history.

(56) References Cited

U.S. PATENT DOCUMENTS 3,189,854 A * 6/1965 Hubbard ....................... 333/255
3,547,406 A * 12/1970 Fowler Ronald Let al. ............................. 254/134.4
4,360,290 A * 11/1982 Ward ............................ 405/170
4,462,430 A * 7/1984 Anthony et al. ................ 138/89
4,718,774 A * 1/1988 Slough .............................. 374/7
4,795,058 A * 1/1989 Hinds ........................... 220/288
4,848,389 A * 7/1989 Pirkle ............................. 137/80
4,964,438 A * 10/1990 Welty .............................. 138/89
5,218,366 A * 6/1993 Cardamone et al. .......... 342/385
5,448,220 A * 9/1995 Levy ........................ 340/539.26
5,534,878 A * 7/1996 Johnson ........................ 343/702
5,552,759 A * 9/1996 Stoyka ..................... 340/426.33
5,650,766 A * 7/1997 Burgmann ............... 340/539.11
5,771,937 A * 6/1998 Collins ........................... 138/93
5,957,206 A * 9/1999 Patel ............................. 166/317
5,960,236 A * 9/1999 Zaman et al. ................... 399/91
6,102,404 A * 8/2000 Barker .......................... 273/385
6,186,847 B1 * 2/2001 Ketterman et al. ............. 441/42
6,416,692 B1 * 7/2002 Iwasaki-Higbee ......... 264/36.17
6,506,014 B1 * 1/2003 Nolfi et al. ................. 415/170.1
6,824,356 B2 11/2004 Nolfi et al.
6,838,964 B1 * 1/2005 Knight et al. ................. 335/216
7,533,698 B2 * 5/2009 Nolfi et al. ...................... 138/89
8,305,228 B2 * 11/2012 Vigneaux ................... 340/854.6
8,436,743 B2 * 5/2013 Auzerais et al. ........... 340/854.7

(Continued)

*Primary Examiner* — Jennifer Mehmood
*Assistant Examiner* — Rufus Point
(74) *Attorney, Agent, or Firm* — Hudak, Shunk & Farine Co. LPA

(57) ABSTRACT

A foreign material exclusion device adapted for use in a cavity of a system or construction, for example a tube, pipe, or the like, the device having a body that is adapted to seal a first side of the cavity from a second side of the cavity and prevent passage of debris past the body, the device further including a sensor operatively connected to the body and adapted to measure a property of the environment adjacent at least one surface of the device. Methods for utilizing the device to seal a portion of the cavity and to record, and preferably distribute, the data are also described.

15 Claims, 8 Drawing Sheets

(56) References Cited

U.S. PATENT DOCUMENTS

| | | | | |
|---|---|---|---|---|
| 2004/0016774 | A1* | 1/2004 | Gentzkow et al. | 222/175 |
| 2005/0005716 | A1* | 1/2005 | Harris | 73/865.8 |
| 2005/0258959 | A1* | 11/2005 | Schnaare et al. | 340/539.26 |
| 2007/0251690 | A1* | 11/2007 | Whitsitt et al. | 166/278 |
| 2008/0136649 | A1* | 6/2008 | Van De Hey | 340/573.1 |
| 2010/0299278 | A1* | 11/2010 | Kriss et al. | 705/332 |
| 2011/0197413 | A1* | 8/2011 | Kiest, Jr. | 29/402.09 |

* cited by examiner

SENSOR FOREIGN MATERIAL EXCLUSION DEVICES AND METHODS

FIELD OF THE INVENTION

The present invention relates to a foreign material exclusion device adapted for use in a cavity of a system or construction, for example a tube, pipe, or the like, the device having a body that is adapted to seal a first side of the cavity from a second side of the cavity and prevent passage of debris past the body, the device further including a sensor operatively connected to the body and adapted to measure a property of the environment adjacent at least one surface of the device. Methods for utilizing the device to seal a portion of the cavity and to record, and preferably distribute, the data are also described.

BACKGROUND OF THE INVENTION

Foreign material exclusion is important, if not critical, in many fields, especially in the energy field. The goal of foreign material exclusion is to minimize or prevent any material, e.g., debris, which is not designed to be present in a system or device from adversely affecting the system or device, especially during repair or maintenance.

In the energy field, loss or shutdown of a power plant or refinery due to maintenance or breakage can cost millions of dollars per day. Various systems and devices, such as turbines, have a large number of crevices and openings. During maintenance or assembly, small parts, screws, bolts or other foreign objects can be left in the crevices and openings. If not retrieved or noticed, the objects have the potential to cause damage to the system or device. Accordingly, maintaining an inventory of tools and foreign materials is very important.

Various methods and constructions have been developed to provide for foreign material exclusion in industry, including, but not limited to, foreign material exclusion devices, caps, plugs, tapes, or the like.

U.S. Pat. No. 6,506,014 relates to a device which can be utilized to temporarily seal substantially any opening on a turbine which is being assembled or repaired. The foreign material exclusion device reportedly advantageously maintains fail-safe integrity of desired portions of a turbine. Protection of the sensitive areas of a turbine prevents possible hazardous malfunctions or explosions of a turbine. The foreign material exclusion device is substantially elastic or resilient and can be compressed to fit into a desired opening and can be re-expanded to provide a snug fit about an opening.

U.S. Pat. No. 6,824,356 relates to a device which can be utilized to temporarily seal substantially any opening on a turbine which is being assembled or repaired. The foreign material exclusion device includes a main body, preferably formed from a foamed polymer or rubber. The foreign material exclusion device is substantially elastic or resilient and can be compressed to fit into a desired opening and can be re-expanded to provide a snug fit about an opening. An extraction member is connected to the main body and is preferably utilized to remove the device from a portion of a cavity of a turbine.

In an effort to maintain inventory of foreign material exclusion devices, various solutions have been proposed.

U.S. Pat. No. 7,533,698 relates to a foreign material exclusion device which is adapted to be utilized in tubes, pipes, or the like to prevent entry of debris into a potentially sensitive area of an assembly, such as a turbine assembly utilized in a power plant. In one embodiment, the device is adapted to be connected to a non-moving portion of a rotary milling tool, such as the collet, before a milling operation to prevent milling debris from entering a sensitive portion of a tube or pipe. In a further embodiment, each device of the invention includes a unique identifier or identification element, such as a machine readable bar code or RFID (radio frequency identification) tag, to insure all devices utilized for a particular job are accounted for.

Although various foreign material exclusion devices, in some cases, can be identified remotely, problems still exist as various conditions in some areas of the systems, devices or constructions cannot be easily ascertained. In view of the above, it would be desirable to enhance foreign material exclusion efforts and provide operators with additional tools to aid in their efforts.

SUMMARY OF THE INVENTION

It is, therefore, an object of the present invention to provide foreign material exclusion devices having improvements in traceability, debris control, data collection and transmission.

A further object of the present invention is to provide a foreign material exclusion device that can collect and transfer information to a desired location.

Still another object of the present invention is to provide a foreign material exclusion device with the ability to seal an opening or cavity such as in a pipe, tube, or other orifice, the device including one or more sensors that can measure a property of the ambient environment in an area relatively near the device.

Yet another object of the present invention is to provide a foreign material exclusion device having one or more sensors that can monitor the environment, preferably within a sealed cavity and can, for example measure properties such as pressure, temperature, shock or provide imaging or visual information.

An additional object of the present invention is to provide the foreign material exclusion device with a lanyard including electronic wiring, circuiting, etc. that serves as a conduit to relay data to and from one or more sensors of the device as well as to provide power to the sensor. The lanyard also maintains a physical connection of sufficient strength, operatively to the body of device, to be able to retract the device from an opening or cavity without damage and further retain the device should vacuum conditions be encountered.

A further object of the present invention is to provide a foreign material exclusion device having a body adapted to seal an opening or cavity in a portion of a system, such as a tube or pipe, and one or more sensors for measuring pressure at a specific location or the difference in pressure between two points, such as on two sides or faces of the device, wherein the sensor is connected to a lanyard which has a transmitter adapted to extend outside of a cavity, wherein the lanyard has a display device connected thereto such that the property or properties measured by the sensor are displayable by the display device, and wherein the sensor and display device are powered by one of more of a) a portable power source, such as a battery and b) power available from a standard outlet to which the display device and sensor can be connected via a plug.

Another object of the present invention is to provide a foreign material exclusion device having a body adapted to seal an opening or cavity in a portion of a system, such as a tube or pipe, and one or more sensors for measuring pressure at a specific location or the difference in pressure between two points, such as on two sides or faces of the device, wherein the sensor is in communication with a further device, namely a transmitter, so that the information obtained by the sensor can be viewed at a remote location, preferably by a reader. The device can transfer information either via a wire or wireless communication. Furthermore, in some embodiments, the sensor information can be stored and thereby recorded.

Still a further object of the present invention is to provide a foreign material exclusion device including a body adapted to seal an opening or cavity in a portion of a system, such as a tube or pipe, and a sensor in communication with a further device so that the information obtained by the sensor can be viewed at a remote location and further having a sensor that is able to measure impact or provide imaging.

In one aspect of the present invention, a sensor foreign material exclusion device is disclosed, comprising a body adapted to seal a cavity of a construction, the body including one or more of a) a portion that is locatable in the cavity to seal a first side of the cavity from a second side of the cavity, and b) a portion that covers the cavity, a sensor operatively connected to the body and having a portion adapted to be located in the cavity, the sensor capable of sensing a property of the cavity, and a transmitter operatively connected to the sensor and operatively connected to the body, the transmitter operable to transmit the conditions sensed by the sensor to a display device.

In another aspect of the present invention, a sensor foreign material exclusion device is disclosed, comprising a body having a first face and a second face, with a side located between the first face and second face, the body having a portion that is compressible and adapted to be placed into a cavity and re-expanded thereby capable of holding the device in place via a compression fit in an internal location in the cavity and thereby sealing a first side of the cavity from a second side of the cavity, a sensor operatively connected to the first face of the body and having a portion adapted to be located in the cavity, the sensor capable of measuring a property adjacent the first face of the body, and a transmitter operatively connected to the sensor and operatively connected to the body, the transmitter able to transmit the property sensed by the sensor.

In a further aspect of the present invention, a method for sealing a cavity and measuring a property of the cavity is disclosed, comprising the steps of sealing a cavity of a construction with a foreign material exclusion device, the foreign material exclusion device comprising a body including a sensor operatively connected to the body, the sensor having a portion located in the cavity, the device having a transmitter connected to the sensor and operatively connected to the body, measuring a property in the cavity with the sensor, and transmitting the property sensed by the sensor to a display device.

In a further aspect, said foreign material exclusion device senses pressure differential and relays information as noted herein. In some embodiments said foreign material exclusion device has an autonomous or remotely actuated, such as through a lanyard or cable as described herein, device integral with the foreign material exclusion device to relieve pressure, without compromising the integrity of the seal created by the foreign material exclusion device and without transmitting certain matter or debris between sides of the foreign material exclusion device between faces as pressure anomalies may arise.

BRIEF DESCRIPTION OF THE DRAWINGS

The invention will be better understood and other features and advantages will become apparent by reading the detailed description of the invention, taken together with the drawings, wherein.

DETAILED DESCRIPTION OF THE INVENTION

Figure 1:
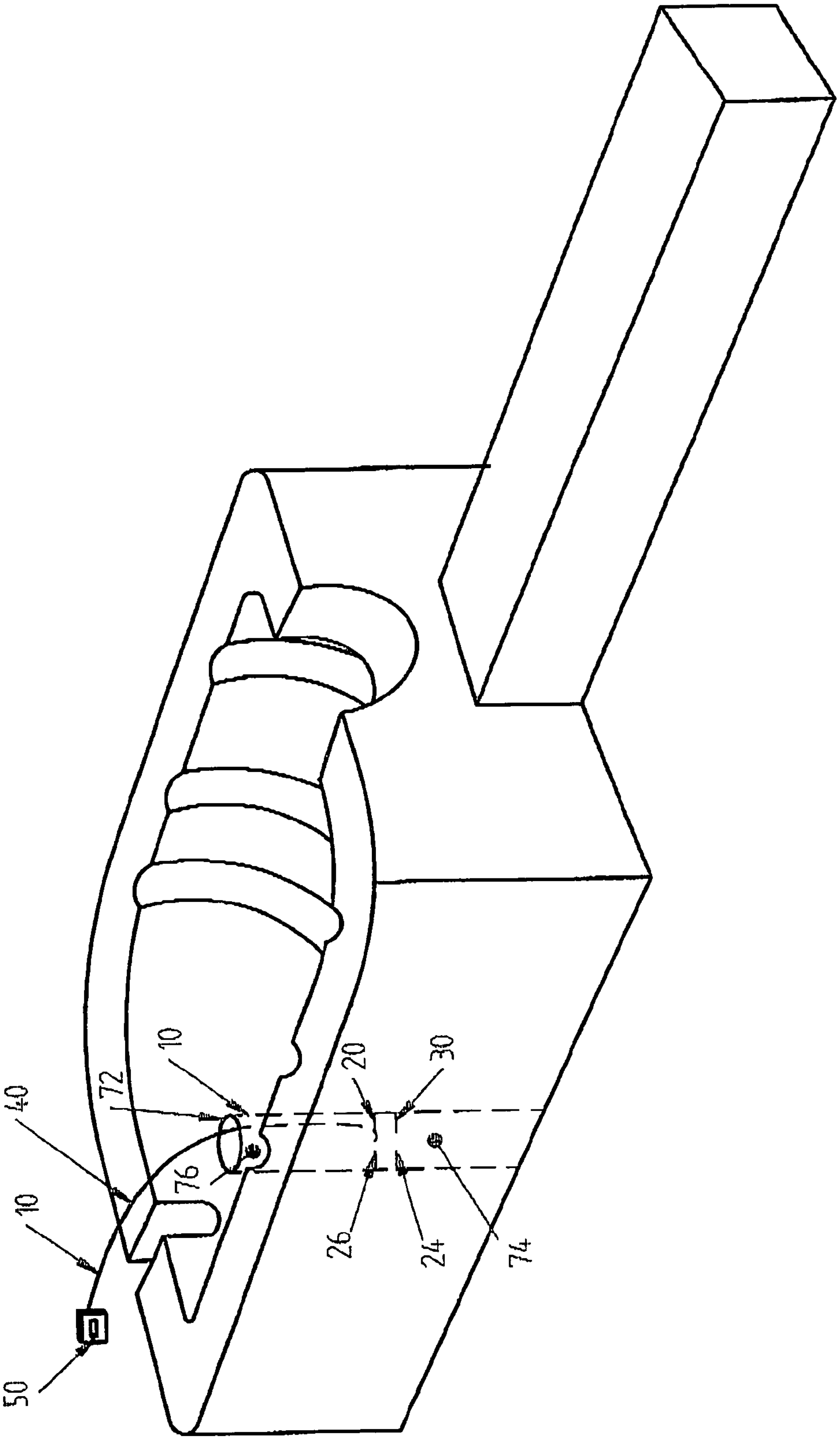
FIG. 1 is a schematic view cross-sectionally illustrating one embodiment of a foreign material exclusion device of the present invention located in a cavity of a construction or system sealing a first side of the cavity from a second side of the cavity, the device including a resilient, compressible body, a sensor operatively connected to the body, and able to measure a property in the cavity, and a transmitter, in particular a lanyard having data or power cables as well as the ability, i.e., strength, to aid in removal of the body from the cavity, connected to the sensor and operatively connected to the body and capable of transmitting the property sensed by the sensor to a display device or reader, that is also illustrated.

This description of preferred embodiments is to be read in connection with the accompanying drawings, which are part of the entire written description of this invention. In the description, corresponding reference numbers are used throughout to identify the same or functionally similar elements. Relative terms such as “horizontal,” “vertical,” “up,” “down,” “top” and “bottom” as well as derivatives thereof (e.g., “horizontally,” “downwardly,” “upwardly,” etc.) should be construed to refer to the orientation as then described or as shown in the drawing figure under discussion. These relative terms are for convenience of description and are not intended to require a particular orientation unless specifically stated as such. Terms including “inwardly” versus “outwardly,” “longitudinal” versus “lateral” and the like are to be interpreted relative to one another or relative to an axis of elongation, or an axis or center of rotation, as appropriate. Terms concerning attachments, coupling and the like, such as “connected” and “interconnected,” refer to a relationship wherein structures are secured or attached to one another either directly or indirectly through intervening structures, as well as both movable or rigid attachments or relationships, unless expressly described otherwise. The term “operatively connected” is such an attachment, coupling or connection that allows the pertinent structures to operate as intended by virtue of that relationship.

The sensor foreign material exclusion devices of the invention have a number of main functions. One function is to seal a portion of a cavity, particularly a potentially sensitive area of the cavity or another area of a system, device or construction including the cavity which can be accessed through the cavity, from foreign materials or debris not intended or desired to be located in the cavity. A further function of the device is to monitor a condition or property of the cavity, in one embodiment, a portion of the cavity not directly exposed to the ambient atmosphere when the device is situated in a desired position, such as adjacent a first side or face of the body inserted into the cavity. Still a further function is to provide remote access to the measured properties or conditions, either wired or wirelessly. Yet a further function is to provide a record of information provided by the sensor. Still a further function is to provide a record of the physical location of the device in real or near real time. Another function of the device is to monitor a condition or property such as pressure, force, temperature, or shock, within the cavity or adjacent area.

The foreign material exclusion devices can be utilized wherever it, is desired to exclude foreign material from a construction and acquire information about a property or condition associated with an area adjacent the device. The foreign material exclusion devices are particularly adapted to be utilized in tubes, pipes, machine or construction apertures, or the like in order to protect from intrusion of foreign material or debris into a predetermined area of the tube, pipe or the like, and to provide information about a property associated with a portion of the cavity. For example, it is desirable to protect a turbine at a power plant from debris as the turbine can be catastrophically damaged by parts, metal shavings, or even foreign material exclusion devices that are left in the construction during repair or maintenance. Foreign material exclusion devices are typically utilized during construction, assembly, repair, or the like of a portion of a construction such as, but not limited to, a turbine, pump, fan, housing boiler tubes, or other devices with access openings and cavities. The foreign material exclusion devices of the invention are designed to be removed after construction, repair or maintenance.

Figure 7:
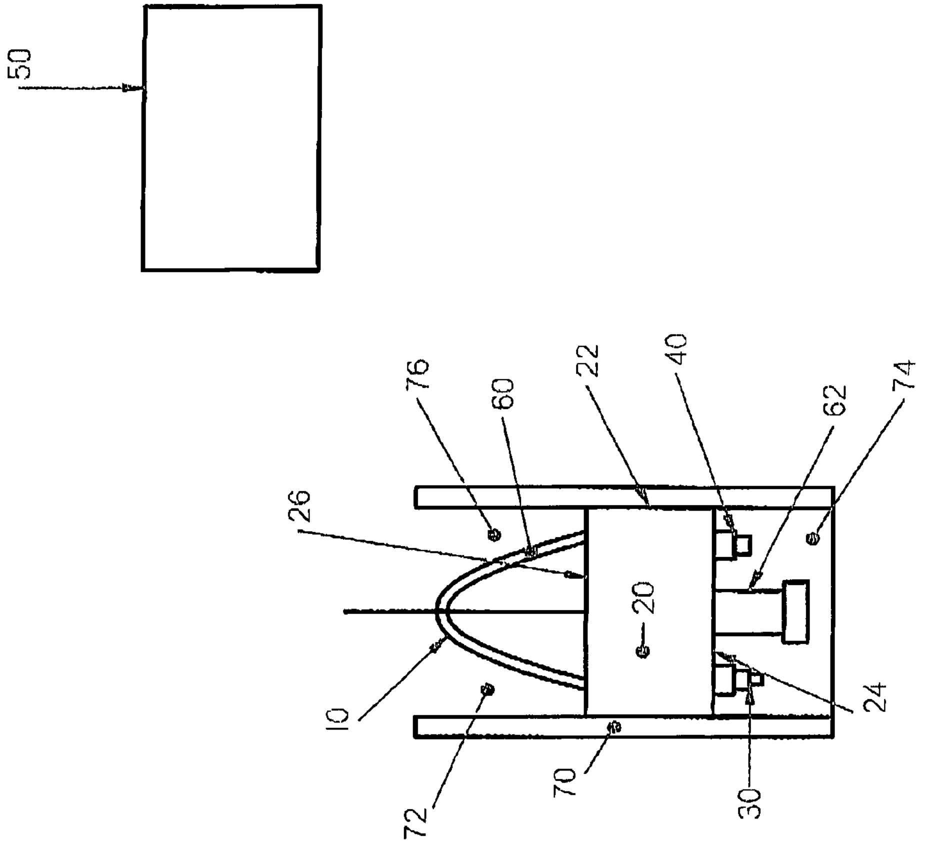
FIG. 7 is a schematic view cross-sectionally illustrating one embodiment of a foreign material exclusion device of the present invention located in a cavity of a construction or system sealing a first side of the cavity from a second side of the cavity, the device including a resilient, compressible body, a sensor operatively-connected to the body, and able to measure a property in the cavity, and a transmitter connected to the sensor and operatively connected to the body and capable of transmitting the property sensed by the sensor to a reader, that is also illustrated in the Figure, via a wireless connection.

Referring now to the drawings, wherein like numerals refer to like or similar features throughout the several views, FIG. 1 illustrates embodiment of a foreign material exclusion device 10 comprising a body 20, a sensor 30 operatively connected to the body 20, and a transmitter 40, in this embodiment a wire or cable integrated into an extraction member or lanyard that aids in removal of the body from the construction 70, in this embodiment a portion of a turbine assembly, is connected to the sensor 30 and operatively connected to the body 20. In addition to the lanyard including transmitter 40 which can relay for example data and power, the lanyard provides a physical connection of sufficient strength to retract the device from the cavity without damage and also to retain the device should vacuum conditions be encountered within the cavity. When it is desired that the device 10 be utilized within a cavity 72 such as shown in FIG. 7, the device preferably includes an extraction member 60. Illustrated in FIG. 1 is a cavity 72 in which the body 20 is located thereby forming a first side 74 and a cavity second side 76. In the embodiment illustrated in FIG. 7, the system or construction 70 illustrated is a tube or pipe having a cavity 72, wherein cavity first side 74 is formed on an opposite side of the body 20 and a cavity second side 76 by virtue of the device being located in the cavity.

The sensors of the present invention are suitable for measuring a desired property or condition adjacent an area of the body 20 of the device 10. Various different types of sensors can be utilized on the sensor foreign material exclusion devices of the invention. In order to accomplish objectives of the user, one or more, two or more, or even three, etc. or more same or different sensors can be operatively connected to the body 20. Examples of suitable sensors include, but are not limited to, a pressure sensor, a pressure differential sensor, an impact measuring sensor, a position sensor, a force sensor, an imaging sensor, a temperature sensor and a flow rate sensor. Suitable sensors include, but are not limited to, a pressure sensor such as a SBX series pressure sensor available from Honeywell Sensing & Control of Columbus, Ohio and a MMA690 series accelerometer available from Freescale Semiconductor of Austin, Tex. Connection can be made by generally any suitable coupler such as a small diameter coupler for example, Omega SMP or M12 series connectors and suitable cabling. The power source for the sensor can then be any suitable source for example, a portable power source such as a battery, or a standard power source from the commercial power supply, for example at a wall socket or outlet such as 110 or 220 volts. The battery or portable power source utilized to power the sensor can be operatively connected to the body, or be provided at a remote location, such as at the display device.

In one embodiment, the sensor 30 is wired via transmitter 40 to the display device or reader 50 whereby a signal sensed by the sensor 30 can be transmitted to the display device 50 and power can be provided by a battery. In some embodiments, display device 50 utilizes power from a wall outlet, such as through a suitable plug or the like which transmits required power to the sensor 30 as desired through the transmitter 40 which in this embodiment also includes appropriate power leads as well as desired cabling to transmit properties sensed by the sensor to the display device.

Figure 2:
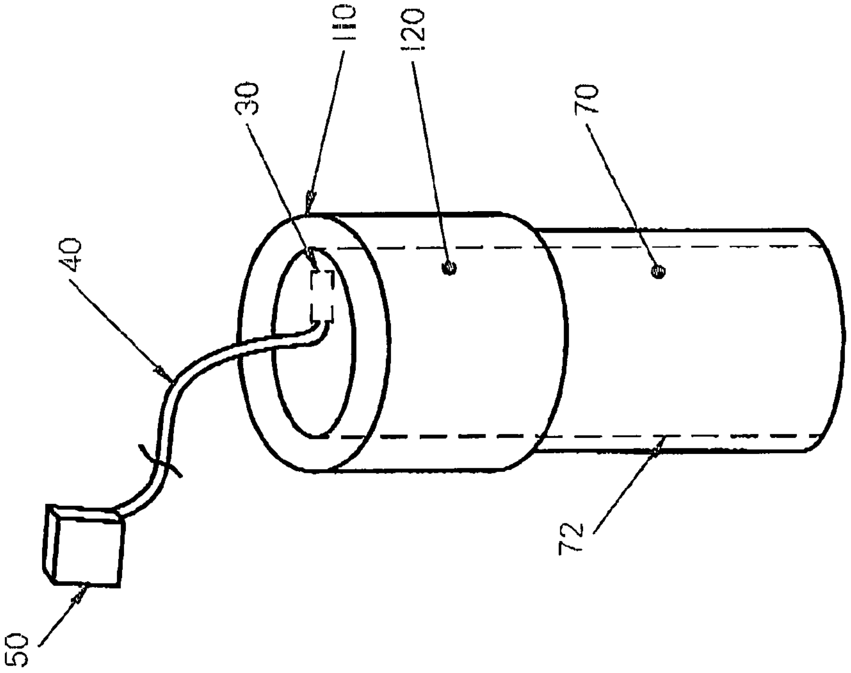
FIG. 2 is a side elevational view of a further embodiment of a foreign material exclusion device of the present invention having the form of a cap or cover illustrated sealing a cavity that is, in this embodiment, present within a pipe, the device including a sensor adapted to sense the condition in the cavity and a transmitter connected to the sensor.

In one embodiment, the sensor 30 is located on the face 24 of the body 20 adapted to be situated on the first side of the cavity 74 and located further away from the ambient atmosphere than a second face 26, see FIGS. 1 and 7 for example. Therefore, the sensor 30 is disposed in the portion of the cavity generally sealed off by the body 20 from the end of the cavity in which the body was inserted, see FIGS. 1 and 7 for example. FIG. 2 for example, is an embodiment where foreign material exclusion device 110 includes a body 120 that is in the form of a cap or cover. The body 120 includes a portion that extends over or around the construction 70. The sensor 30 is located on an inside surface of the body 120 such that the sensor is disposed in a portion of the cavity 72.

In the embodiment illustrated in FIG. 2, the transmitter 40 is a cable that contains wiring that provides the sensor 30 with power and is also able to transmit the property or condition sensed by the sensor 30 to the display device 50. The transmitter 40 is preferably a part of a lanyard, such as described above that provides sufficient strength to retract the device from the cavity and also to retain the cavity within the device should vacuum conditions be encountered.

Figure 3:
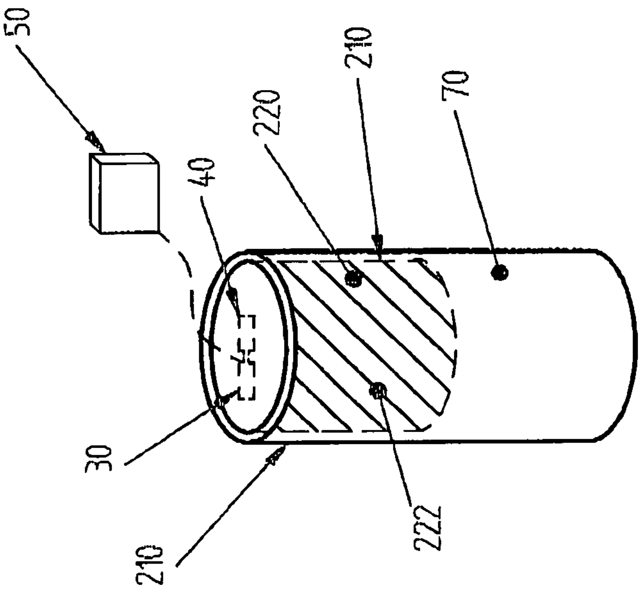
FIG. 3 is a further embodiment of a foreign material exclusion device of the present invention, particularly in the form of a plug, preferably threaded, adapted to seal a cavity, the device including a sensor for transmitting the condition sensed by the sensor to a reader.

FIG. 3 illustrates a further embodiment of a foreign material exclusion device 210 that can be described as a threaded plug. The body 220 includes threads 222 adapted to matingly engage with similar threading on a construction or system. The sensor 30 and preferably transmitter 40 are located on an inside surface of the body 220 and, therefore, capable of measuring a property in a cavity into which the foreign material exclusion device 210 is placed. In preferred embodiments, the sensor 30 is capable of measuring a property internal to the construction including the cavity, for example a tube or a pipe in one embodiment. As described hereinbelow, in some embodiments, the information provided by the sensor is transferred by a communication link of the transmitter to a remote display device 50, such as a reader, preferably utilizing radio frequency in one embodiment.

Figure 4:
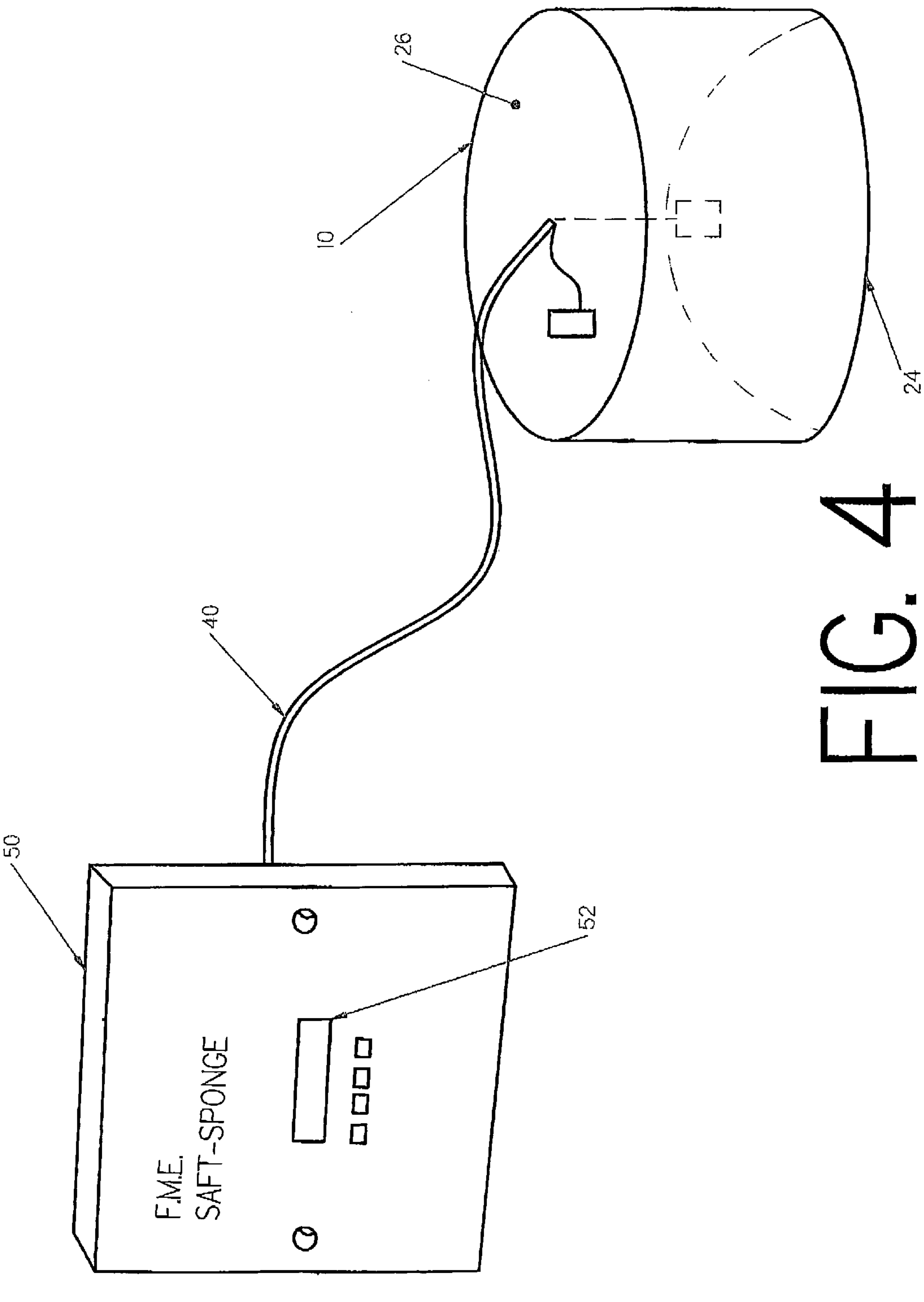
FIG. 4 is a further embodiment of a side perspective view of a foreign material exclusion device of the present invention including a sensor connected to each face of the body and to a transmitter and display device that is particularly useful for measuring a pressure differential, temperature, and/or force on each side of the body and when installed in a cavity of a system or construction, the device can measure pressure, temperature and/or force on each side of the cavity with the body located therebetween, and excessive pressure differential, temperature and/or force can be a precursor to piping, valve or circuit failure.
Figure 5:
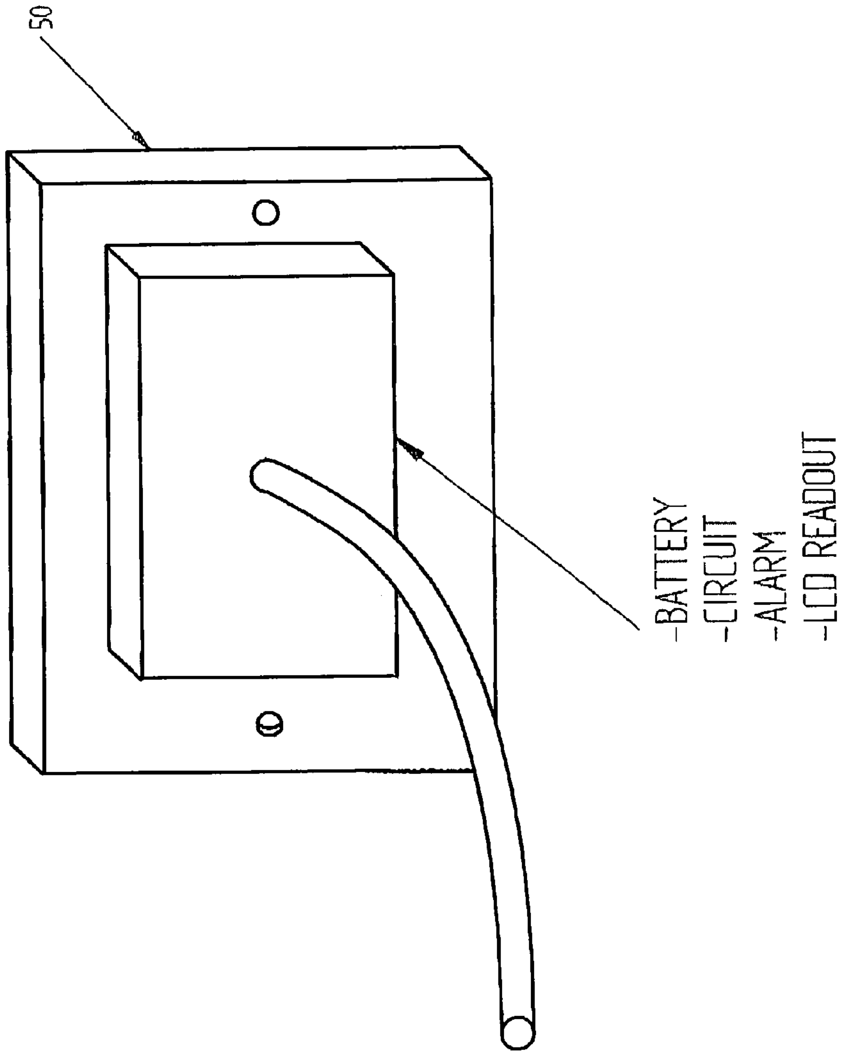
FIG. 5 is a rear perspective view of a display device of the present invention connected to a transmitter, wherein the display device is located outside of a cavity such that the display can be read by an operator.

In a further embodiment, the sensor 30 has the ability to measure properties adjacent both faces 24, 26 of the body 20, see FIG. 4 for example. As illustrated, the sensor 30 has a sensing portion present on each face 24, 26 on opposite sides of the body 20. In this embodiment, the sensor 30 can measure a difference in properties between two different areas. In one preferred embodiment, the sensor is a pressure differential sensor that can measure pressure on each side of the body, adjacent faces 24, 26.

A pressure sensor is utilized in one embodiment of the foreign material exclusion devices of the present invention. Pressure sensors are generally classified as devices having the ability to measure gas pressure, generally air pressure, of an area surrounding the foreign material exclusion device. The pressure sensor can be, for example, an absolute pressure sensor that measures pressure relative to a perfect vacuum pressure or a gauge pressure sensor that can measure pressure relative to a given atmospheric pressure at a given location. Any type of pressure sensor can be utilized, for example, but not limited to, a force collector, such as a diaphragm, piston, or bellows. Various types of sensors are known in the art, for example, piezoresistive strain gauges, piezoelectric type sensors, capacitive sensors, electromagnetic sensors, optical sensors and potentiometric sensors, for example. Suitable sensors are available from Intersema Sensoric SA of Devaix, Switzerland, Precision Measurement of Ann Arbor, Mich. and Endevco of San Juan, Calif.

Pressure differential sensors are utilized in one embodiment of the present invention to measure the difference between two or more pressures identified by the sensor unit or units that can, for example, measure the pressure drop across the foreign material exclusion device. The differential pressure can be utilized to measure flow across the body in an embodiment where the body is a porous construction. Pressure change can be a precursor or concurrent indicator of failure within the piping system.

Impact-type measuring sensors are used in one embodiment for measuring a shock or impact. Impact sensors have the ability to notify an operator that the device has sensed an impact that may be caused by debris. This could prompt the operator to investigate to determine the type of debris and the cause of the impact. The information provided by the impact sensor is beneficial in contrast to an existing practice of waiting until assembly to, hopefully, notice missing debris, such as from a turbine or other source. Efficiency of a repair or assembly process can be greatly improved by providing a device with an impact sensor that has the ability to quickly provide notice of an impact as opposed to remedially finding and identifying debris. Impact measuring sensors also have the ability to supplement or replace robots in some instances that are guided remotely down passages to look for debris, which can be expensive and time-consuming. The sensors of the present invention provide dynamic foreign material exclusion as opposed to the existing practices which generally rely on static foreign material exclusion. The devices of the present invention are adapted to notify foreign material exclusion technicians in real time or near-real time of potential issues that could impact construction or assembly of an object as opposed to the practice of remedially finding problems. Impact sensors are available from, for example, AGM Container Controls, Tucson, Ariz.

Any type of imaging sensor can be utilized in one embodiment of the present invention. Image sensors generally convert an optical image, such as an image taken from a perspective of the foreign material exclusion device and focused into a construction, such as into a pipe, tube or other orifice. The image sensors of the present invention are adapted to either provide still imagery, i.e., pictures, or video, or both, as desired by the user. Samples of image sensors include, but are not limited to, CCD image sensors and CMOS sensors. Image sensors allow users to determine, visually, information regarding the location at which the foreign material exclusion device is located. Image sensors also have the ability to provide foreign material exclusion technicians with real time or near-real time views inside a cavity or other location. Image sensors allow technicians to quickly inspect the foreign material exclusion device and/or the area adjacent the device remotely. By utilizing two or more sensors, for example an impact sensor and an imaging sensor, the technician can be notified of an anomaly via the sensors and an imaging sensor can be utilized to visually inspect the foreign material exclusion device and/or surrounding area remotely. Foreign material exclusion devices are frequently installed in areas not easily accessed. Remote imaging allows a technician to be kept free from radiation exposure that can occur during repair of nuclear facilities.

The one or more sensors are connected to a transmitter. The transmitter is either wired to a display device or reader or able to send and receive communications wirelessly as known in the art. The transmitter is also operatively connected to the body of the foreign material exclusion device. In one embodiment, the transmitter can be integrated with the one or more sensors. Numerous different types of communications are possible such as a radio frequency transmission. As described hereinabove, in one embodiment, the sensor is directly connected to the display device through the transmitter which generally comprises cabling to provide the ability power the sensor and allow the sensor to provide the information generated by the sensor to the display device. As described herein, the transmitter can be incorporated into a lanyard comprising a cable, cord or the like, operatively connected to the body that can be used to aid in removal of the body of the device from a cavity after a desired operation is performed.

In one embodiment, the wireless transmitter may contain unique information used to identify the foreign material device that is attached to and can share that information along with information obtained from the one or more sensors wirelessly with the reader. Data is exchanged between the wireless transmitter and the reader using radio waves in one embodiment between the transmitter and the reader, and no direct line of sight is required for the transaction. Importantly, foreign material exclusion devices containing sensors and transmitters can be identified even in tubes, pipes or other orifices of various constructions.

Wireless transmitters are generally passive or active. Passive transmitters have no internal power source and active transmitters have their own power source. Both types of transmitters are available as rewriteable and, therefore provide additional flexibility to the foreign material exclusion device system. RFID readers and transmitters are currently available from sources such as LXE of Norcross, Ga., Zebra Technologies Corporation of Lincolnshire, Ill., or the like.

In one embodiment, a memory device is used in conjunction with the wireless transmitter. One or more sensors such as a flash-EEPROM or other memory devices. Accordingly, values generated by the sensor, for example pressure readings, can be stored until transfer to the reader. The use of the memory device allows the rate at which the transmitter sends data to be different from the rate at which the properties are measured by the foreign material exclusion device and sent to the reader.

The reader can communicate with the wireless transmitter at generally any interval desired by the user.

In various embodiments of the invention, the display device includes a display 52 such as a gauge, meter, or other output signal, such as an alarm, adapted to display one or more results or measurements obtained by the sensor. One embodiment of a display 52 is set forth in FIG. 4.

The composition of the body of the foreign material exclusion device is generally a polymer, a rubber, or a polymer or rubber foam although other materials, e.g., metals, can be utilized. The body can be generally any suitable material that allows the foreign material exclusion device to be placed within an opening or orifice and held in place for a desired period of time in order to prevent foreign materials from passing from a first side of the cavity to a second side of the cavity. It is important that the body or a portion of the body in one embodiment is elastic or resilient in nature so that it can be compressed to fit into a desired opening, and yet re-expand to provide a snug fit within or about the opening, see FIGS. 1 and 7 for example. The resiliency of the body allows the foreign material exclusion device to hold itself in place in a predetermined location or orifice.

The actual size dimensions, i.e. the length, width, and thickness of the bodies of foreign material exclusion devices of the present invention will vary depending on the size and shape of the orifice, tube, opening, etc. which is to be protected or isolated. That is, the body of foreign material exclusion device is not limited to one specific geometric or random shape or size such as a cylinder, cube, block, or the like, but is custom tailored or profile fit to the dimensions of generally each cavity or turbine assembly orifice. That said, preferred foreign material exclusion devices have a body that is substantially cylindrical or block shaped. The body is dimensioned to provide a resilient, snug fit with the above-mentioned orifice which thereby provides a barrier to the entrance of foreign materials. Foreign materials can generally be defined as any object, particle or the like such as, but not limited to, nuts, bolts, metal bits, debris, hand tools, sockets, measuring devices, or any other material not designed to be located in a desired area of a turbine assembly. The thickness of body generally measured in a direction parallel to the longitudinal direction of walls of tube such as shown in FIG. 1, is sufficient to maintain a snug or tight fit about the desired opening, with body being generally from about 0.5 or about 1 to about 12, desirably from about 2 to about 8, and preferably from about 4 to about 6 inches thick. Dimensions can vary widely by application, with the primary goal of foreign object exclusion requiring sufficient strength to retain the heaviest object used in that portion of the protected device or construction.

The body of the foreign material exclusion device of the present invention is generally formed from a polymer or rubber, and is preferably a foam or foam-like material. Foams are cellular materials generally having small hollow spaces which occur during manufacture of the foam. If the cells are fully surrounded by cell walls, the foam is called closed cell foam. In mixed cell foams, the cell walls are partially perforated. In open cell foams, the cells have gas phase connections to each other. Any of the above-mentioned foam types can be utilized in the present invention so long as the foams can be resiliently compressed and prevent the foreign material from entering a predetermined area of the turbine. Generally, open cell foams are preferred as they are more flexible and elastomeric when compared to closed cell foams which tend to be compression resistant.

Suitable polymer compositions which can be foamed to form the body of the present invention include polyethylene, e.g. low density polyethylene and high density polyethylene (HDPE), polypropylene, and copolymers of ethylene or propylene and a monoethylenically unsaturated monomer copolymerizable therewith. Other suitable polyolefins include branched polypropylene homopolymer and branched copolymers of polypropylene. Examples also include copolymers of ethylene and acrylic acid or methyl acrylic acid and $C_1$-$C_4$ alkyl esters or ionomeric derivatives thereof; ethylene vinyl-acetate copolymers; ethylene/carbon monoxide copolymers; anhydride containing olefin copolymers of a diene; copolymers of ethylene and an alpha-olefin having ultra low molecular weight (i.e., densities less than 0.92 g/cc); blends of all of the above resins; blends thereof with polyethylene (high, intermediate or low density), etc.

Other suitable polymeric compositions which may be used in the practice of the invention include, but are not limited to, polyesters, polyamides, polyvinyl-chloride, polyvinylidene chloride, polycarbonates, polyurethanes, and polystyrene resins.

Rubbers including copolymers of ethylene and propylene can be prepared by known addition polymerization techniques, including the use of small amounts of a diene such as butadiene. Additional rubber or elastomeric components include various conjugated dienes having from 4-8 carbon atoms such as isobutylene, butadiene, and ethylene/propylene/diene interpolymers may be included in the blend if desired. Rubbers include the aromatic containing rubbers such as styrene, butadiene rubber and the like. Moreover, additional components such as crosslinking agents designed to provide latent crosslinking of the ethylenic or propylenic polymer, such as silane functional crosslinking agents, or covalent or ionic crosslinking agents, may be included if desired.

The thermoplastic polymer material or blend is melt processed in a conventional manner by feeding, melting, and metering into a conventional melt processing apparatus such as an extruder. A volatile blowing agent and an optional crosslinking agent are mixed with the polyolefin polymer or blend under a pressure suitable to form a flowable gel or admixture. A crosslinking agent may be added in an amount which is sufficient to initiate crosslinking and raise the pressure of the mixture to less than that pressure which causes melt fracture of the polymer to occur. The term “melt fracture” is used in the art to describe a melt flow instability of a polymer as it is extruded through a die, which flow instability causes voids and/or other irregularities in the final product. Any other known methods for producing foam compositions can also be utilized to form the foam utilized in the present invention.

The foam blends are generally prepared by heating the desired polymer or rubber to form a plasticized or melted polymer material, incorporating therein a blowing agent to form a foamable gel, and extruding the gel through a die to form the foam product. Prior to mixing with the blowing agent, the resin or blend is heated to a temperature at or above its glass transition temperature or melting point. The blowing agent may be incorporated or mixed into the melt polymer material by any means known in the art, such as with an extruder, mixture, blender, or the like. The blowing agent is mixed with the melt polymer material at an elevated pressure sufficient to prevent substantial expansion of the melt polymer material and to generally disperse the blowing agent homogeneously therein. Optionally, a nucleating agent may be blended in the polymer melt or dry blended with the polymer material prior to plasticizing or melting. The foamable gel or melt is typically cooled to a lower temperature to optimize physical characteristics of the foam structure. The gel may be cooled in the extruder or other mixing device or in separate coolers. The gel is then extruded or conveyed through a die of desired shape to a zone of reduced or lower pressure to form the foam product. The zone of lower pressure is at a pressure lower than that in which the foamable gel is maintained prior to extrusion through the die. The lower pressure may be super-atmospheric or sub-atmospheric (vacuum), but is preferably at an atmospherical level.

The polymer or rubber foam may be open or closed-celled, as desired. The percentage of open cells can be controlled, as is well known in the art, by appropriate selection of blowing agents, additives, polymers, and processing parameters, such as temperatures, pressures, and extrusion rates. One preferred foam of the present invention is polyester.

While the density of the foam can vary, the foams of the present invention are generally considered lightweight and range generally from about 1 to about 200 or 300 kg/$m^3$, desirably from about 5 to about 150 kg/$m^3$, and preferably from about 10 to 20 to about 50, about 75, or about 100 kg/$m^3$.

It is also possible to add various additives such as inorganic fillers, pigments, anti-oxidants, acid scavengers, ultraviolet absorbers, flame retardants, surfactants, processing aids, extrusion aids and the like is suitable as known to those of ordinary skill in the art.

Other additives include inorganic substances such as calcium carbonate, talc, clay, titanium oxide, silica, barium sulfate, diatomaceous earth and the like, carbon dioxide generated by the combination of a bicarbonate or a carbonate of sodium, potassium, ammonium or the like and an inorganic or organic acid such as boric acid, citric acid, tartaric acid or the like, thermal decomposition type chemical foaming agents such as azodicarbonamide, benzenesulfonyl hydrazide, toluene-sulfonyl hydrazide and the like.

The volatile foaming agents usable in this invention generally have a boiling point temperature range of −90° C. to +80° C., and include, but are not limited to, aliphatic hydrocarbons such as n-pentane, isopentane, neopentane, isobutene, n-butane, propane, ethane and the like; fluorochlorinated hydrocarbons such as dichlorotetrafluoroethane, trifluoroethane, trichloromonofluoromethane, dichlorodifluoromethane, dichloromonofluoromathane, and the like. Among them, the non-fully halogenated hydrocarbons are preferred because of environmental considerations. Particularly preferred among the non-fully halogenated hydrocarbons are partially or fully fluorinated hydrocarbons and non-fully halogenated fluorochlorinated hydrocarbons. Examples of these include 1-chloro-1,1-fluoro-ethane, 1,1,1,2-tetrafluoroethane and 1,1-difluoroethane. Particularly preferred among the aliphatic hydrocarbons are isobutene and isobutene/n-butane mixtures. Other blowing agents which may be employed include alcohols such as methanol and ethanol. Also contemplated are inorganic blowing agents such as carbon dioxide, water, nitrogen, argon and combinations thereof, as well as combinations of these inorganic blowing agents with hydrocarbon and/or halogenated hydrocarbon blowing agents. Also decomposable blowing agents, such as azobisformamide, may be incorporated with the volatile foaming agents. Mixtures of any or all of these volatile foaming agents are also contemplated within the scope of the invention. Also contemplated are combinations including water and/or carbon dioxide as the primary blowing agent.

The foreign material exclusion device optionally, but preferably includes a retaining member or plate 62, as shown in at least FIG. 7. The retaining member 62 generally provides support to the body 20 in an area where the extraction member is attached. Retaining member 62 maintains alignment of the extraction member during retraction and prevents the same from being pulled through the relatively less dense foam body. It also assists in the handling of the device during insertion and retraction.

Examples of various bodies, retaining members, etc. are set forth in U.S. Pat. Nos. 6,506,014 and 6,824,356, both to Nolfi et al., herein fully incorporated by reference.

Retaining member can be made from generally any rigid or semi-rigid materials such as, but not limited to, metal, wood, fiberglass, ceramic, carbon fiber, and the polymer or rubber, or polymer foam or rubber foam listed above which has not been foamed and are herein incorporated by reference, e.g. polyethylene, polypropylene, nylon, polyvinyl chloride, etc. Preferably, retaining member 62 is polyvinyl chloride or nylon. The purpose of the retaining member 62 is to prevent the extraction member 60 from being pulled through the relatively softer body while maintaining alignment of the relative parts.

Extraction member 60 is connected to body through retaining member to allow the foreign material exclusion device to be removed from its location in a construction once the device is no longer needed. An extraction member 60 is adapted to be removably connected to a rope, string, line, hook, cable, or other retrieval member which can be pulled on by a person in order to allow extraction of the foreign material exclusion device. Extraction member 60 may or may not contact body 20 due to the configuration or presence of the retaining member 62, if present. Any number of extraction members can be attached to the body. Generally, an extraction member 60 forms a loop which is attached to body 20 and retaining member 62, if present. As shown in FIG. 7, two ends of extraction member 60 have each been inserted through the body 20. The ends are tied or otherwise suitably fastened to preferably form a loop and a piece of shrink-wrap is optionally attached to the knot to prevent the same from becoming untied or undone. Extraction member 60 is generally a rope, line, or cable made from any woven or nonwoven, natural fiber, such as cotton, or synthetic material such as nylon or non-foamed thermoplastic, as stated hereinabove. Nylon is preferred.

Optionally, but preferably, a flame retardant, resistant, or quenching coating or covering is applied to any of the foreign material exclusion devices described with this application, preferably on at least body thereof. The flame retardant coating or covering can be applied to one or more faces of the body, i.e., 24, 26, especially the portion thereof which can be exposed to high temperature debris, chips, filings, etc., such as from a welding or cooling process on the construction such as a tube or pipe, see FIG. 1. The coating or covering is also heat resistant. The coating or covering is any suitable thickness to provide the desired flame or heat resistant properties. In one embodiment, the coating or covering is on top of or in surface contact with at least a portion of the device, and in a second embodiment, saturates a portion of the body of the device in addition to being present on a surface. Coating or covering on the foreign material exclusion device has a sufficient thickness to achieve the desired goal of providing flame retardant, flame resistant, or the like properties. Coating or covering thickness may vary from surface to surface and vary on a single surface, and ranges generally from about 0.010 to about 0.25 inch, desirably from about 0.020 to about 0.20 inch, and preferably from 0.05 to about 0.15 inch.

Such coatings are well known in the art and are generally latexes such as HCF from PDI, Inc. of Circle Pines, Minn. Coverings of the present invention include, but are not limited to, woven and nonwoven, natural and synthetic fibers, and are available from Sandel of Amsterdam, N.Y. as Non-Combustible Fiber. In other embodiments, coverings are a layer(s) of organic or inorganic material, or a combination thereof, such as a polymer layer or a graphite layer.

The flame retardant coating or covering, or combination thereof, when utilized, is applied to at least one surface of a foreign material exclusion device of the invention utilizing one or more methods, including but not limited to, spray coating, roll coating, screen printing, bonding, or the like. Flame retardant coverings in one embodiment are applied utilizing an adhesive comprising a hot melt adhesive, an epoxy, a polyurethane, a phenolic resin or the like, with the adhesive disposed between the covering and foreign material exclusion device body surface. Hot melt adhesives are preferred in one embodiment. In a preferred embodiment, a sheet of body material having a predetermined thickness is coated with the coating on at least one surface by roll coating, spraying or the like. Afterwards, one or more, and preferably 2 to about 50 or about 100 foreign material exclusion device bodies are formed from the coated sheet. In one embodiment, body is cut from the sheet, preferably with a die cutting apparatus, waterjet cutting apparatus, or cold laser as known in the art.

Figure 6:
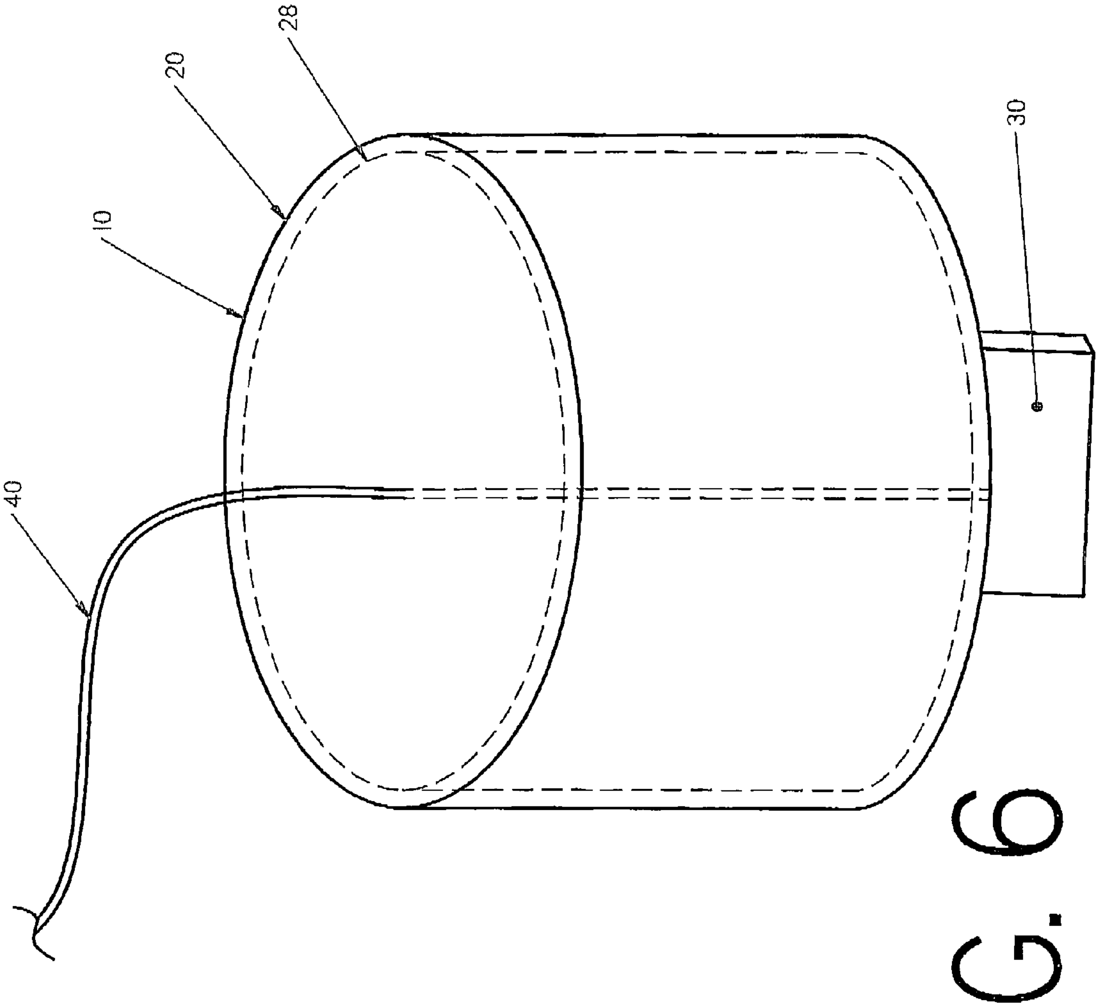
FIG. 6 is a side perspective view of a further embodiment of a sensor foreign material exclusion device including a body comprising a covering and a sensor connected to the body covering.

In one embodiment, such as illustrated in FIG. 6, the foreign material exclusion device includes the plurality of layers or sections, for example a polymer or rubber core, generally a polymer or rubber foam core, and an outer covering 28. The outer covering can be a flame retardant or non-flame retardant covering such as a fabric, woven or non-woven, natural or synthetic, preferably synthetic, or any combination thereof. In this embodiment, the sensor 30 is connected to a covering 28 of the main body. The transmitter 40 is preferably part of a lanyard or other device capable of aiding in removal of the foreign material exclusion device 10 from the cavity and is connected to the covering of the body in the embodiment illustrated.

Figure 8:
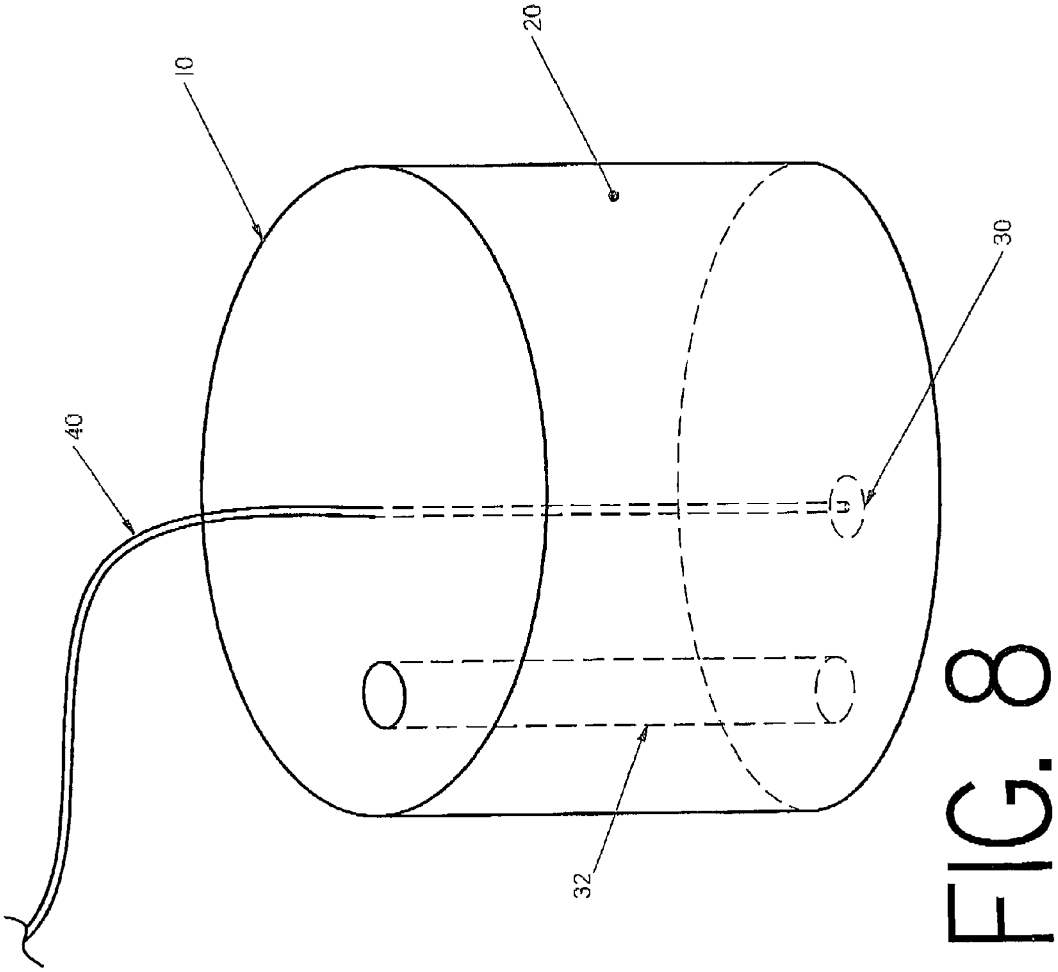
FIG. 8 is a side elevational view of a further embodiment of a sensor foreign material exclusion device of the present invention including a pressure relief valve.

The body 20 of the foreign material exclusion device 10 of the present invention can be formed from numerous different materials as described hereinabove. As such, the body can be formulated to achieve a range of desired porosity such that in some embodiments air can be allowed to diffuse through the body from one side of the cavity to the other. In additional embodiments, the density of the body may be such that it is difficult or substantially impossible for gasses such as air to pass through the main body of the foreign material exclusion device. Therefore, in one embodiment, such as shown in FIG. 8, the foreign material exclusion device is provided with a pressure relief vent 32. The pressure relief vent 32 can be in the form of a check valve for example, that extends from one face of the foreign material exclusion device to a second face of the foreign material exclusion device to allow automatic pressure venting in one or more directions. The vent aids in preventing destructive pressure differences from developing on opposite faces of the body of the device. The vent can be actuated automatically, as indicated, or either electronically or mechanically, such as autonomously or manually in conjunction with an electronic control via a cable and electronic display and electronic display and relay device as noted herein. For example one embodiment, a sensor 30 is operatively connected thereto that determines ambient pressure adjacent the body of the device.

The present invention provides for sensor foreign material exclusion devices having the ability to provide information regarding properties of the ambient environment adjacent the device. The transmitter of the foreign material exclusion device can store relevant data obtained from the sensor to later download into a tracking program or alternatively, can immediately transmit the information received. The ability to quickly relay data, track and catalog foreign material exclusion devices reduces the chance of leaving damaging debris behind. The devices further reduce quality control engineer and inspector workload while increasing effectiveness. Higher quality repairs can be achieved in less time. The sensors of the foreign material exclusion devices allow important data to be relayed in real or near-real time and problems can be identified and solved earlier than in current practice.

In accordance with the patent statutes, the best mode and preferred embodiment have been set forth, the scope of the invention is not limited thereto, but rather by the scope of the attached claims.

What is claimed is:

1. A sensor foreign material exclusion device for measuring a property of an environment adjacent at least one surface of the device, comprising:

a body adapted to seal a cavity of a construction, the body including a portion that is locatable in the cavity to seal a first side of the cavity from a second side of the cavity, wherein the body is a resilient body and has a portion that when inserted into the cavity is compressible and adapted to fit into the cavity and thereafter re-expandable to hold the device in place via a compression fit of the body in an internal location in the cavity thereby sealing the first side of the cavity from the second side of the cavity;

a sensor operatively connected to the body and having a portion adapted to be located in the cavity, the sensor sensing a property of the cavity; and a transmitter operatively connected to the sensor and operatively connected to the body, the transmitter operable to transmit the conditions sensed by the sensor to a display device, wherein the transmitter is a cable that is integrated into a lanyard comprising a cable or cord that is operatively connected to the body and provides a physical connection for retracting the device from the cavity, wherein the transmitter is connected to the display device that displays the conditions sensed by the sensor.

2. The device according to claim 1, wherein the sensor is one or more of a pressure sensor, a force sensor, a pressure differential sensor, an impact measurement sensor, a temperature sensor, a flow rate sensor, and an imaging sensor.

3. The device according to claim 1, wherein the sensor is directly located on a face of the body adapted to be situated on the first side of the cavity and located further away from the ambient atmosphere than a second face of the body.

4. The device according to claim 1, wherein the sensor has a sensing portion located on each face of the body and can measure properties adjacent both faces.

5. The device according to claim 4, wherein the sensor is a pressure differential sensor.

6. The device according to claim 1, wherein the transmitter comprises both power and data cables, wherein the power cable provides the power source for the sensor, and wherein the data cable transfers data regarding conditions sensed by the sensor to the display device.

7. The device according to claim 1, wherein the device further includes a reader separate from the transmitter and operable to wirelessly transmit to or receive, or both transmit to and receive, signals from the transmitter.

8. A sensor foreign material exclusion device, comprising:

a body having a first face and a second face, with a side located between the first face and second face, the body having a portion that when inserted into a cavity is compressible and adapted to be placed into the cavity and re-expanded thereby holding the device in place via a compression fit in an internal location in the cavity and thereby sealing a first side of the cavity from a second side of the cavity;

a sensor operatively and directly connected to the first face of the body and having a portion adapted to be located in the cavity, the sensor measuring a property adjacent the first face of the body; and a transmitter operatively connected to the sensor and directly connected to a face surface of the body or an inside surface of the body, the transmitter able to transmit the property sensed by the sensor to a display device.

9. The device according to claim 8, wherein the sensor is one or more of a pressure sensor, a force sensor, a pressure differential sensor, impact measurement sensor, a temperature sensor, and an imaging sensor.

10. The device according to claim 9, wherein the device further includes a reader separate from the transmitter and operable to wirelessly transmit to or receive or both transmit to and receive signals from the transmitter, and wherein the transmitter is operable to transmit the property sensed by the sensor to the reader.

11. The device according to claim 8, wherein the transmitter comprises a power cable and data cable, wherein the power cable provides the power source for the sensor, wherein the data cable transfers data regarding conditions sensed by the sensor to the display device, and wherein the transmitter is operable to transmit the property sensed by the sensor to the display device.

12. A method for sealing a cavity with a sensor foreign material exclusion device and measuring a property of the cavity adjacent at least one surface of the device, comprising the steps of:

obtaining a foreign material exclusion device, the foreign material exclusion device comprising a body including a sensor operatively connected to the body, the device having a transmitter connected to the sensor and operatively connected to the body, wherein either i) the transmitter is a cable that is integrated into a lanyard comprising a cable or cord that is operatively connected to the body and provides a physical connection for retracing the device from the cavity, wherein the wire or cable of the transmitter is connected to the display device that displays the conditions sensed by the sensor, or ii) the transmitter is directly connected to a face surface of the body or on an inside surface of the body, wherein the body has a portion that is compressible and re-expandable;

compressing and inserting a portion of the body and placing the body within the cavity and thereafter allowing the body to re-expand to hold the body in place via a compression fit thereby sealing a first side of the cavity from a second side of the cavity;

measuring a property in the cavity with the sensor; and transmitting the property sensed by the sensor to the display device.

13. The method according to claim 12, wherein measuring the property in the cavity with the sensor comprises taking a pressure reading, measuring pressure differential between the first side of the cavity and the second side of the cavity, measuring impact, measuring temperature, or providing an image or a combination thereof.

14. The device according to claim 1, wherein the device further comprises a pressure relief valve that is adapted to allow venting of gasses from one side of the body to another side of the body.

15. The method according to claim 12, wherein the transmitter is integrated into the lanyard, and further including the step of retracting the device from the cavity with the lanyard.

* * * * *